Sept. 16, 1930.  F. S. McQUESTON  1,776,236
STOPPING MECHANISM FOR ELECTRICALLY DRIVEN SPINDLES
Filed Aug. 29, 1929   2 Sheets-Sheet 1
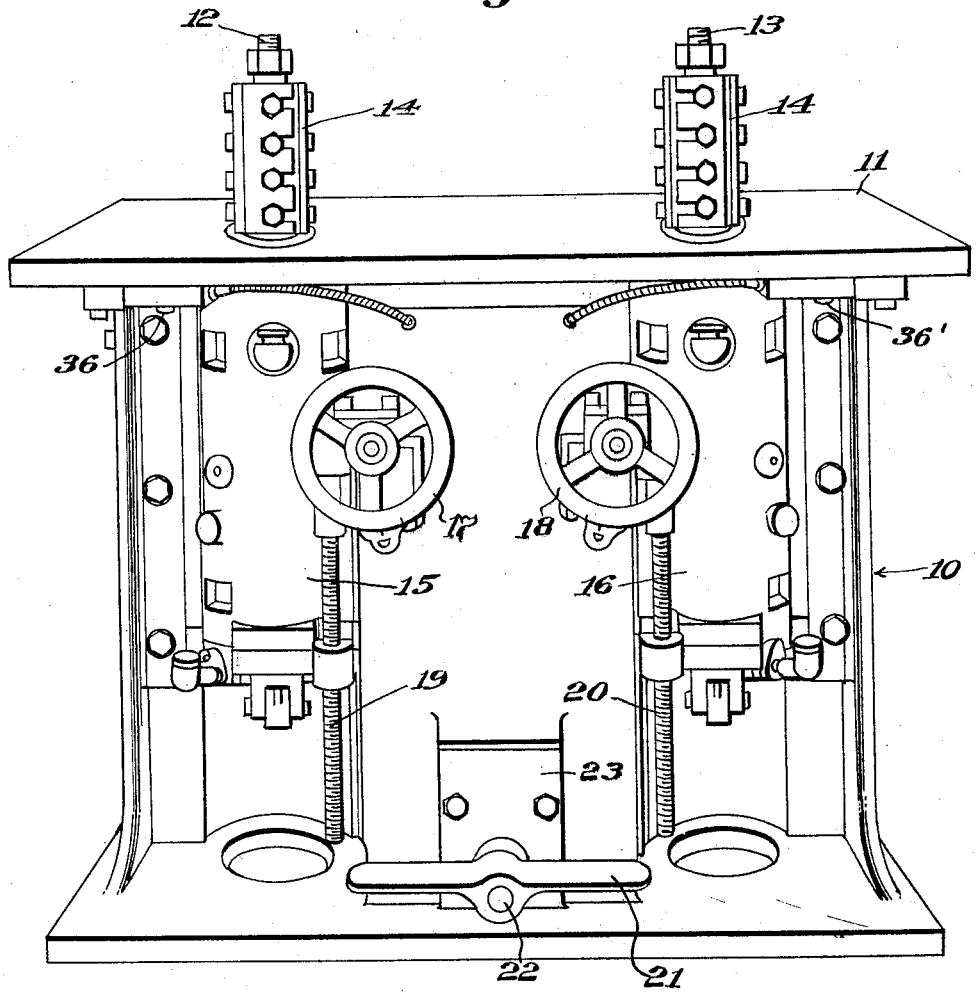
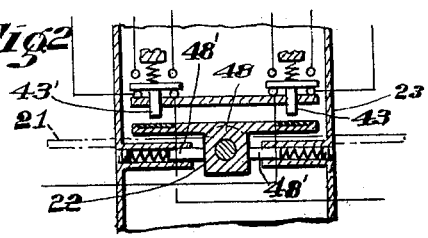
INVENTOR
Frank S. McQueston
BY
ATTORNEY

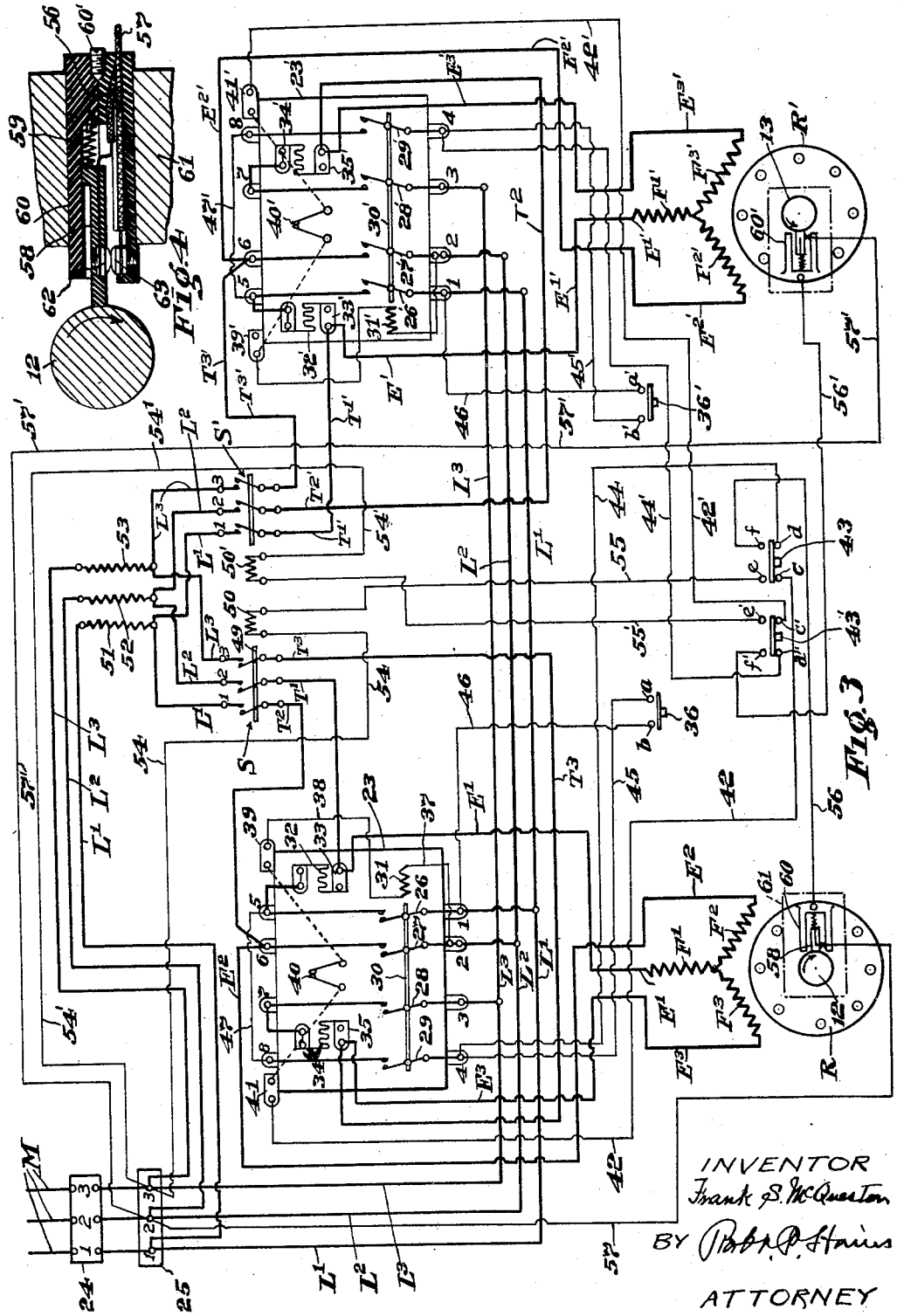

Patented Sept. 16, 1930

1,776,236

UNITED STATES PATENT OFFICE

FRANK S. McQUESTON, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS

STOPPING MECHANISM FOR ELECTRICALLY-DRIVEN SPINDLES

Application filed August 29, 1929. Serial No. 389,133.

This invention relates to wood working shapers and more particularly to electrical mechanism for quickly arresting the rotation of shaper spindles, and is directed to various improvements in the electrical feature of the Robert L. Smith application Ser. No. 358,683, filed April 27, 1929.

Woodworking shapers as commonly constructed are provided with a work supporting table upon which the work is supported while it is acted upon by a revolving cutter that is secured to a driving shaft or spindle.

These shaper spindles are relatively heavy, and are supported by antifriction bearings to rotate with a minimum amount of friction, and the spindles are operated at high speed (usually in excess of 5000 R. P. M.); it therefore follows that the spindles rotate for a considerable length of time after the power has been cut off.

The spinning of these cutter spindles after the power is cut off presents an element of danger to persons working near the rotating cutters, and the delay that occurs while the spindle is coming to rest may necessitate the loss of time on the part of the machine attendant, who cannot change the cutter until the spindle stops turning.

It has been proposed heretofore to employ mechanical or friction brakes to arrest the rotating cutter spindles, but the friction elements of mechanical brakes tend to heat up and wear out rapidly due to the high speed of the spindle when the brake is applied, and are otherwise unsatisfactory.

The cutter spindles of wood shapers are commonly driven by directly attached electric motors, and highly satisfactory results are secured through the employment of the induction type of motor the rotor of which is mounted upon the shaper spindle, so that the spindle and rotor operate as a unit. The squirrel cage type of induction motor is frequently employed since its use avoids the need of contact brushes associated with the rotor, and this type of motor may be operated at any desired speed depending upon the number of poles of the motor and the frequency of the current supplied.

The present invention contemplates a construction whereby the rotation of a spindle by momentum after the power has been cut off may be quickly arrested by causing the driving motor to temporarily exert a turning force upon the spindle in a reverse direction to thereby check the turning movement of the spindle. In this manner the spindle is quickly brought to rest through the action of magnetic forces, and the use of contacting friction surfaces is avoided.

The desired electrical braking or retarding action may be obtained by producing magnetic fields in the motor stator that rotate in the reverse direction to the rotating spindle so that the electrical torque produced by these fields will tend to rotate the spindle in the opposite direction. This reversed electric torque, however, will not only bring the spindle quickly to rest but will cause the spindle to rotate in the opposite direction if the current is not cut off as soon as the spindle comes to rest.

An important feature of the present invention therefore resides in means associated with or controlled by the rotating spindle and operable to cut off the current to the motor as soon as the spindle starts to rotate in the reverse direction. This desired result may be readily secured by supporting a sensitive, switch controlling element in contact with the rotating spindle so that as long as the spindle rotates in the intended direction the sensitive element will remain in one position, but as soon as the spindle starts to turn in the opposite direction the sensitive element and its associate switch will be actuated to cut off the current to the motor.

Another important feature of the present invention resides in separate switch means for controlling the motor driving current and the motor reversing current, and in switch controlled mechanism for actuating these separate switches in the proper order; and still a further feature of the invention resides in pedal controlled means for operating said separate switches to bring the spindle quickly to rest.

A further feature of the invention resides in a wood shaper having cutter spindles that rotate in opposite directions, and in foot pedal adapted to be shifted in one direction to cut off the driving current to one cutter spindle and subject the spindle to the action of a reverse electrical torque to quickly check its rotation, and which pedal is adapted to be shifted in the opposite direction to bring the other spindle quickly to rest.

The various features of the invention and novel combination of parts will be best understood from the following description when read in connection with the accompanying drawings wherein:—

Fig. 1 is a perspective view of a double spindle shaper provided with the braking mechanism of the present invention;

Fig. 2 is a vertical sectional view through the pedal controlled switch mechanism;

Fig. 3 is a diagrammatic view of the wiring employed in the shaper of Fig. 1 to control the right and left spindles; and Fig. 4 is a sectional view through spindle controlled switch means to be described.

The electric braking mechanism of the present invention, as above stated, may be employed in various machines to arrest quickly a spinning shaft or spindle, but is designed more particularly for use upon cutter spindles, and the invention may be employed in connection with a single spindle, or upon each spindle of a double spindle shaper, as illustrated.

The double spindle shaper shown in Fig. 1 may for the most part be of well known construction and consists of the supporting frame 10 having the usual work supporting table 11 provided with the left cutter spindle 12 and the right cutter spindle 13, and each of these spindles is adapted to receive a cutter 14.

The spindles 12 and 13 are or may be driven by induction motors of the well known squirrel cage type, the three phase type of motor being indicated in Fig. 3. The stator of the motor for driving the spindle 12 is mounted in a housing 15 and the stator for the motor that drives the spindle 13 is mounted in a similar housing 16. Each of these housings is attached to a yoke or slide employed to support the cutter spindle for vertical adjustment, and the desired vertical adjustment of the spindles 12 and 13 is obtained by rotating the hand wheels 17 and 18 to operate the adjusting screws 19 and 20. The rotor R of each motor is mounted on the spindle which it operates.

Near the base of the shaper is provided a double ended pedal 21 the central portion of which is rigidly secured to a transversely extending shaft 22 which shaft extends into a switch box 23 for operating motor stopping switches mounted therein, and which will be further on described.

The mechanism so far described is of well known construction and operates in a well known manner to shape or dress wood presented to the cutters 14, one cutter being driven in a clockwise direction by the spindle 12, and the other cutter is driven in a contra-clockwise direction by the spindle 13.

In carrying out the present invention for braking or retarding the rotation of a spindle after the driving power has been cut off, it is not necessary to make any changes in the type of induction driving motor employed heretofore, since the desired braking action may be produced by simply reversing the direction of rotation of the magnetic fields. Various constructions may be employed for controlling the driving current to the motor and for temporarily changing the order of exciting the motor fields to thereby reverse the direction in which the magnetic fields rotate, and one good practical form of switch mechanism and wiring to this end will now be described.

Referring to Fig. 3 of the drawing, current for operating the driving motors is obtained from the alternating current supply line M having the three wires shown for delivering three-phase current to the induction motors. The operation of the motor for driving the spindle 12 is controlled from the switch board 23 which may be of well known construction and has the lower terminals 1, 2, 3, 4, and the corresponding upper terminals 5, 6, 7 and 8. The supply line M may have the fuse switch 24 and terminal board 25, and the terminals 1, 2 and 3 of the switch board 23 are connected to the corresponding terminals of the board 25 by the conductors $L^1$, $L^2$, $L^3$, respectively. Upon the switch board 23 is provided a gravity switch having the four contacts or fingers 26, 27, 28 and 29 which are shown as connected by a bar 30 to insure the simultaneous movement of these fingers. The construction of this gravity switch is such that it opens automatically but is held closed as long as the magnet coil 31 is excited.

When the gravity switch 30 is closed current flows from the contacts 1, 2 and 3 through the switch fingers 26, 27 and 28 and conductors shown, to the upper terminals 5, 6 and 7. Current passes from the terminal 5 through the coil 32 of a temperature or thermal overload relay of well known construction, to the terminal 33, and the terminal 33 is connected to the motor that drives the spindle 12 by the conductor $E^1$. The stator of the induction motor is shown as having the three angularly disposed fields $F^1$, $F^2$, and $F^3$, and the conductor $E^1$ leads to the field $F^1$.

The terminal 6 is connected to the field $F^2$ of the motor by the conductor $E^1$. Current from the terminal 7 passes through the coil 34 of the thermal-overload relay to the terminal 35 and then flows from the terminal 35 through the conductor $E^3$ to the stator field $F^3$. It will be seen from the connections just described that when the gravity switch 30 is closed current will be supplied to the stator fields $F^1$, $F^2$, $F^3$ to excite these fields in the order just mentioned, and this will rotate the spindle 12 in the direction indicated by the arrow in Fig. 3. The mechanism so far described forms no essential part of the present invention, but has been set forth to make clear the novel features to be described.

It is desirable that the construction be such that the motor for operating the spindle 12 may be started by pressing a push button 36 conveniently located beneath the work supporting table 11 at the left-hand side of the machine, as shown in Fig. 1. This push button 36 serves to excite the magnet coil 31 to close the gravity switch 30, and in order to accomplish this current is supplied from the terminal 2 through the conductor 37 to the coil 31 and from the latter through the conductor 38 to the terminal 39 and thence through the contact elements 40 of the thermal-overload relay to the terminal 41, this relay being adapted to open the circuit and stop the motor in case of an overload.

The terminal 41 is connected by the conductor 42 to a terminal $c$ of the foot operated switch 43 which switch is normally held closed as shown in Fig. 3, so that as long as this switch is closed current may flow from the terminal $c$ to the terminal $d$ and through the conductor 44 to the terminal 4 and from this terminal through the conductor 45 to a terminal $a$ of the hand operated switch or push button 36 above mentioned. This switch remains open except when held closed by the machine attendant. When the switch or push button 36 is closed to start the spindle 12 current flows from $a$ to $b$ and through the conductor 46 to the terminal 1. This closes the circuit including the magnet coil 31 to excite the same and cause the gravity switch to close. The gravity switch however would open again as soon as the machine attendant releases the push button 36 and in order to prevent this the fourth finger or interlock 29 of the gravity switch is provided so that as soon as the gravity switch is closed current may flow from terminal 4 through the switch finger 29 to terminal 8 and thence through the conductor 47 to the terminal 5 and through the contactor finger 26 to the terminal 1, thus completing a second circuit adapted to maintain the magnet coil 31 excited after the push button switch 36 is opened.

It will be understood from the circuits just described that when the push button 36 is actuated to close the circuit in which it is included the magnet coil 31 will be excited to close the gravity switch and start the motor, and as soon as this occurs the circuit controlled by the fourth finger or interlock 29 is closed to excite the coil 31 after the normally opened switch 36 has been released by the machine attendant.

When it is desired to stop the motor for operating the spindle 12 this is readily accomplished by depressing the left-hand side of the foot pedal 21 so that the switch actuating lever 48 provided within the switch casing 23, and which is rigidly secured to the rocking shaft 22, will be actuated to raise the switch 43 to open the circuit normally closed by the switch. This will serve to cut off the supply of current to the magnet coil 31 whereupon the gravity switch for supplying current to the motor will open. The foot pedal 21 is normally held in the horizontal position in which it is shown so that either end may be depressed by foot pressure. On removing the foot pressure the pedal is returned to its horizontal position by the spring pressed plungers 48' positioned to act upon the opposite sides of the hub of the lever 48.

As above pointed out the cutter spindles operate at high speed and are relatively heavy, so that they will continue to rotate for a substantial length of time after the current to the spindle driving motor has been cut off, and the present invention contemplates a construction whereby a reverse turning torque may be exerted upon the rotor of the cutter spindle to exert an electrical driving action upon the spindle which will quickly bring it to rest. This is readily accomplished by altering the order of exciting the fields $F^1$, $F^2$, $F^3$, and the mechanism shown for changing the order of exciting these fields will now be described.

A reverse turning torque is produced within the stator of the motor, in the construction shown, by providing the reversing switch S having the three-contact or fingers shown, and connected by the bar 49 so that they will move together, the construction of the switch S being such that it normally remains open but is held closed as long as the magnet coil 50 is excited, and will open as soon as the current to the coil 50 is cut off. Current is supplied to the terminals 1, 2 and 3 of the switch S by the conductors $L^1$, $L^2$, and $L^2$ leading from the corresponding terminals of the board 25. When the switch S is closed current will flow from the conductor $L^1$ through this closed switch to the conductor $T^2$ leading to the terminal 6, which terminal, as above stated, is connected to the field $F^2$ by the conductor $E^2$, and current will also flow along the conductor $L^2$ through the closed switch and along the conductor $T'$ to the terminal 33, and from this terminal through the conductor $E^1$ to the field $F^1$; and current may also flow from the conductor $L^3$ through this switch and along the conductor $T^3$ to the terminal 35 which is connected to the field $F^3$ by the conductor $E^3$. It will be seen from the connections just described that when the gravity switch 30 is open and the gravity switch S is closed, the fields of the stator will be excited in the order of $F^1$, $F^3$, $F^2$, to thereby exert a turning torque upon the rotor R in the reverse direction. It is not desirable to supply full current to the stator in the reverse direction and this is readily prevented by introducing the resistors 51, 52 and 53 in the circuits $L^1$, $L^2$, $L^3$, leading to the switch S, as will be apparent from the drawing.

It is desirable that the means for cutting off the driving current to the spindle motor and the means for supplying the electric braking or reversing current to said motor shall be controlled by the foot pedal 21, and the means whereby the reversing switch S is placed under the control of the pedal 21 will now be described.

As above stated, the switch S is closed by exciting the magnet coil 50 one side of which coil is connected to the terminal 3 of the terminal board 25 by the conductor 54, and the opposite terminal of the coil 50 is connected to the terminal e of the switch 43 by the conductor 55. The terminal f of the switch 43 is connected by the conductor 56 to one terminal of a non-reversing switch to be described, and the other terminal of this non-reversing switch is connected to the terminal 2 of the terminal board 25 by the conductor 57.

It will be apparent from the construction just described that when pressure is exerted upon the left-hand side of the pedal 21 the switch 43 will first be moved out of engagement with the contacts c, d to open the circuit in which the magnet coil 31 is included, so that the gravity switch 30 will open and cut off the supply of current to the motor, and as soon as the switch 43 is elevated sufficiently by the depressed pedal 21 to engage the contacts e, f, current will be supplied to the magnet coil 50 through the circuits just described to excite this coil and close the reversing switch S, whereupon the rotating spindle will be quickly brought to rest through the reversal in the order in which the fields of the stator are excited.

Since the closing of the switch S causes the stator fields to be excited in the reverse direction, the electrical retarding force thus produced upon the rotor R will not only serve to bring the spindle 12 quickly to rest, but will cause the spindle to start rotating in the opposite direction unless the switch S is opened as soon as the spindle comes to rest. It is desirable to provide means for preventing the spindle from being rotated in its reverse direction. This is accomplished, in accordance with the present invention, by providing a sensitive switch controlling element, which is positioned to engage the rotating spindle 12, the arrangement being such that as long as the spindle rotates in the intended direction the sensitive element will remain in the switch closed position, but as soon as the spindle starts to turn in the opposite direction the sensitive element will be actuated to open the switch and cut off the current to the motor.

The sensitive element shown for accomplishing this result consists of a bar or plunger 58 (see Fig. 4) which is formed of hard fibre or other insulating material, and the outer end of which may rest directly against the smooth surface of the cutter spindle 12. The outer end of the plunger 58 is normally held against the spindle 12 by a spring 59 and the plunger 58 is mounted in a fibrous casing or the like 60. The casing 60 preferably has the form of a split cylinder adapted to fit snugly in a cylindrical opening formed in the bracket or spindle supporting frame 61, the arrangement being such that the split cylinder casing 60 may be expanded within this opening to bind it therein in the desired position of adjustment relative to the spindle 12 by adjusting the tapered screw 60. The construction just described is such that the sensitive plunger 58 will be held in the position in which it is shown in Fig. 4 by the rotation of the shaft 12 in the direction indicated by the arrow.

As long as the plunger 58 remains in this position a contact 62 carried thereby is held in engagement with a contact 63 secured to a portion of the fibrous casing 60, but as soon as the spindle 12 comes to rest and starts to turn in the opposite direction from that indicated by the arrow in Fig. 4, this reverse turning movement will shift the plunger 58 in a direction to open the switch formed by the contacts 62 and 63. The conductor 56 above described is connected to the contact 62 and the conductor 57 above described is connected to the contact 63. It will therefore be seen that if the pedal 21 is held depressed so that the brake applying switch 43 is maintained in its elevated position after the spindle has come to rest under the action of the reversing currents, the cutter spindle will not be rotated in its reverse direction, due to the circuit braking action of the non-reversing switch just described, since, as soon as the spindle 12 starts to turn in the reverse direction the contacts 62 and 63 will be separated to thereby cut off the current to the magnet coil 50, whereupon the reversing switch S will open, thus cutting off the current to the motor.

If the features of the present invention are employed in a shaper having a right and left cutter spindle as shown in the drawings, the electrical connections for controlling the current to the motor for driving the right-hand spindle 13 and for bringing this spindle quickly to rest after the driving current to the motor has been cut off, may be identical with the wiring and electrical connections above described for controlling the operation of the left-hand spindle 12.

The same numerals and reference characters have therefore been used for the electrical connections for the two cutter spindles except that the reference characters relating to the controlling mechanism for the right-hand spindle have a prime added to each numeral.

It will be seen from the foregoing that the cutter spindle 12 may be started when desired by pressing the push button 36 and that the cutter spindle 13 may be started by operating the push button 36'. When it is desired to stop the cutter spindle 12 the left-hand side of the foot pedal 21 is depressed; this will serve to actuate the cutter stopping and brake applying switch 43 so that it will first cut off the driving current to the motor of the spindle 12, and will then excite the fields of this motor in a reverse order to quickly arrest the rotation of the spindle. As soon as the spindle 12 comes to rest and starts to turn in the reverse direction the non-reversing switch controlled by the sensitive plunger 58 will be opened to cut off the supply of reversing current to the motor. It will therefore be apparent that through the present invention the rotation of one cutter spindle may be quickly arrested by depressing one side of the pedal 21, and the rotation of the other cutter spindle may be quickly arrested by depressing the other side of the pedal.

What is claimed is:—

1. In a wood working shaper, in combination, a cutter spindle having a driving motor, a switch for controlling the operating current to the motor, means for quickly arresting the rotation of the spindle including a reversing switch for temporarily altering the order of exciting the windings of the motor to produce electric forces tending to rotate the spindle in the reverse direction, auxiliary circuits for controlling said switches, and an automatic switch in the auxiliary circuit of the reversing switch and provided with means controlled by the direction of rotation of the spindle and operable by the reverse turning movement of the spindle to cut off the current to the motor.

2. In a wood working shaper, in combination, a cutter spindle having a driving motor, a switch for controlling the operating current to the motor, means for quickly arresting the rotation of the spindle including a reversing switch for temporarily altering the order of exciting the windings of the motor to produce electric forces tending to rotate the spindle in the reverse direction, auxiliary circuits for controlling each of said switches, and interlocked switch mechanism movable to one position to close one auxiliary circuit and to a second position to open the first and close the second auxiliary circuit.

3. In a wood working shaper, in combination, a cutter spindle having a driving motor, a switch for controlling the operating current to the motor, switch mechanism for temporarily altering the action of the current upon the motor to cause it to exert a reverse turning force upon the spindle to bring the spinning spindle to rest, and a foot pedal operable to open said switch to cut off the driving current to the motor and to actuate said switch mechanism to cause the reverse turning force to act upon the spindle to quickly arrest its rotation.

4. In a wood working shaper, in combination, a cutter spindle having a driving motor, a switch for controlling the operating current to the motor, switch mechanism for temporarily altering the action of the current upon the motor to cause it to exert a reverse turning force upon the spindle to bring the spinning spindle to rest, a foot pedal operable to open said switch to cut off the driving current to the motor and to actuate said switch mechanism to cause the reverse turning force to act upon the spindle to quickly arrest its rotation, and means controlled by the direction of rotation of the spindle and operable by the reverse turning movement of the spindle to cut off the current to the motor.

5. In a wood working shaper, in combination, a right hand cutter spindle and a left-hand cutter spindle, a motor for driving each spindle, switches for controlling the driving current to the motors, a reversing switch for each motor for temporarily altering the action of the current upon its motor to cause a reverse turning force to be exerted upon the motor and spindle to bring the spinning spindle to rest, and a foot pedal adapted to be rocked in one direction to cut off the driving current to a motor and to actuate the reversing switch to bring the spindle of that motor to rest quickly under the action of the reverse turning force, and adapted to be rocked in the opposite direction to similarly arrest the spinning movement of the other spindle.

6. In a wood working shaper, in combination, a right-hand cutter spindle and a left-hand cutter spindle, a motor for driving each spindle, switches for controlling the driving current to the motors, a reversing switch for each motor for temporarily altering the action of the current upon its motor to cause a reverse turning force to be exerted upon the motor and spindle to bring the spinning spindle to rest, a foot pedal adapted to be rocked in one direction to cut off the driving current and apply the braking current to one spindle, and adapted to be rocked in the opposite direction to cut off the driving current and apply the braking current to the other spindle, and means associated with each spindle and operable by the reverse turning movement of the spindle to cut off the current to the motor that operates such spindle.

7. In a wood working shaper, in combination, a cutter spindle having a driving motor, a switch for controlling the operating current to the motor, means for quickly arresting the rotation of the spindle including switch mechanism for temporarily altering the action of the current upon the motor to cause it to exert a reverse turning force upon the spindle to check its rotation, auxiliary circuits for controlling said switch and said switch mechanism, a manually operable switch included in one of the auxiliary circuits and adapted to start the motor, and interlocked switches included in said auxiliary circuits and operable to first open the motor operating switch and then close the spindle arresting switch mechanism.

8. In a wood working shaper, in combination, a cutter spindle having a driving motor, a switch for controlling the operating current to the motor, means for quickly arresting the rotation of the spindle including switch mechanism for temporarily altering the action of the current upon the motor to cause it to exert a reverse turning force upon the spindle to check its rotation, auxiliary circuits for controlling said switch and said switch mechanism, a manually operable switch included in one of the auxiliary circuits and adapted to start the motor, interlocked switches included in said auxiliary circuits and operable to first open the motor operating switch and then close the spindle arresting switch mechanism, and a foot pedal for operating the interlocked switches.

9. In a wood working shaper, in combination, a pair of oppositely rotating cutter spindles, a driving motor for each spindle, a pair of switches one for controlling the operation of each motor, means for quickly arresting the rotation of the spindles including independent switch mechanism for temporarily altering the action of the current upon their respective motors to exert a reverse turning torque of the spindles, auxiliary circuits for controlling said switches and said independent switch mechanism, manually operable switches in the auxiliary circuits to start the motors, interlocked switches in the auxiliary circuits and operable to first open a motor driving switch and then close a spindle arresting switch, and a foot pedal for operating the interlocked switches and movable in one direction to quickly arrest one spindle and in the opposite direction to quickly arrest the other spindle.

In testimony whereof, I have signed my name to this specification.

FRANK S. McQUESTON.